United States Patent [19]

Bocca et al.

[11] Patent Number: 4,580,087
[45] Date of Patent: Apr. 1, 1986

[54] STEPPING MOTOR CONTROL CIRCUIT

[75] Inventors: Evasio Bocca, Montemagno; Sandro Cerato, Valle S. Nicolao, both of Italy

[73] Assignee: Ing. C. Olivetti & C., S.p.A., Ivrea, Italy

[21] Appl. No.: 621,475

[22] Filed: Jun. 18, 1984

[30] Foreign Application Priority Data

Jun. 17, 1983 [IT] Italy ................. 67673 A/83

[51] Int. Cl.$^4$ ............................................. H02P 8/00
[52] U.S. Cl. ..................................... 318/696; 318/685
[58] Field of Search ................................. 318/685, 696

[56] References Cited

U.S. PATENT DOCUMENTS

3,727,121 4/1973 Rich ..................................... 318/696
4,286,202 8/1981 Clancy et al. ........................ 318/696

Primary Examiner—William M. Shoop, Jr.
Assistant Examiner—Saul M. Bergmann
Attorney, Agent, or Firm—Banner, Birch, McKie & Beckett

[57] ABSTRACT

An electronic circuit for control of a stepping motor (11), and in particular for damping the oscillations of the rotor thereof, comprises a digital-analog circuit (14) which, using a signal proportional to the angular speed of the rotor, which is taken off on one of the windings of the motor (11), provides a signal (SMR) to the control circuit (12) supplying the windings, so as to modulate the current in the other windings during the phase of stopping the motor in the desired position. This phase is selected by a signal (ATT) from a controlling unit (13) and the modulation is of such a sense as substantially to cancel the undesired oscillations. The circuit may be applied for example to motors for positioning typing elements in office printing or typing machines.

6 Claims, 9 Drawing Figures

STEPPING MOTOR CONTROL CIRCUIT

The present invention relates to an electronic circuit for the control of a stepping motor having a rotor and a plurality of selectively energisable windings, comprising power supply means connected to the windings to cause rotary movement of the rotor towards a desired angular position.

One of the adverse intrinsic aspects of stepping motors, particularly when they are controlled in a non-feed-back manner, that is to say, without the assistance of transducers which are connected to the rotor, is the problem of oscillations of the rotor with respect to the nominal stopped position, which oscillations substantially affect the total time of an angular advance cycle. This phenomenon is very important particularly when the motor is used as a member for positioning elements which are continuously to change their position, for example the character carrying discs of flexible blade type (daisy wheels) which are used in high-speed typing and printing machines, or the magnetic heads which write and read data on magnetic carriers.

One of the known arrangements which are used for damping the oscillations of the rotor of a stepping motor utilizes a metal ring keyed on the motor shaft, in such a way that the metal ring can rotate together with the shaft. The ring is rotatable within a cavity which is filled with lubricating oil and received in a cylindrical container which is held stationary.

That mechanical damping action only partially eliminates the oscillatory movements of the rotor, and also suffers from the disadvantage of substantially increasing the mass associated with the rotor, which thereby has an adverse effect on the efficiency of the motor.

The object of the present invention is to damp the oscillations of the rotor of a stepping motor, using an electronic circuit associated with the circuit for pilot control of the motor.

In accordance with that aim, and for eliminating the disadvantages of mechanical damping arrangements, the circuit according to the invention is characterised in that a damping circuit is connected to one of the windings to pick off an electrical signal representative of the angular speed of the rotor and is connected to the power supply means to modify the power supply to the other windings in such a way as to damp the oscillations of the rotor during stopping thereof in the desired angular position.

The invention will be described in more detail, by way of example, with reference to the accompanying drawings, in which.

Figure 1:
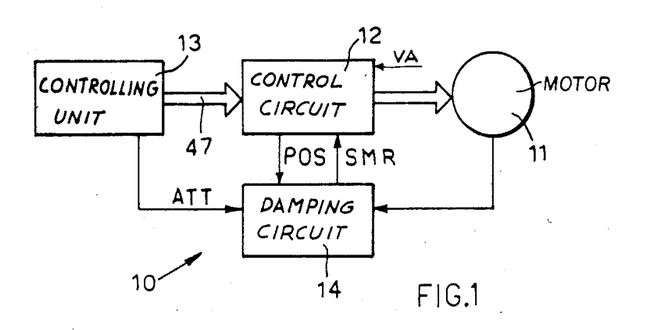
FIG. 1 is a block circuit diagram of a control circuit embodying the invention.

Referring to FIG. 1, an electronic circuit 10 embodying the invention for control of a stepping motor 11 comprises a control circuit 12 which, on the basis of the data supplied thereto by a controlling unit 13 which is formed for example by a microprocessor, is capable of generating control pulses for the windings of the motor 11, as will be seen in greater detail hereinafter. A damping circuit 14 is connected to the motor 11, to the controlling unit 13 and to the control circuit 12.

Before going into a detailed description of the damping circuit 14 and the effective connection thereof to the other parts of the circuit 10, some considerations relating to stepping motors in general will be set out.

Figure 2:
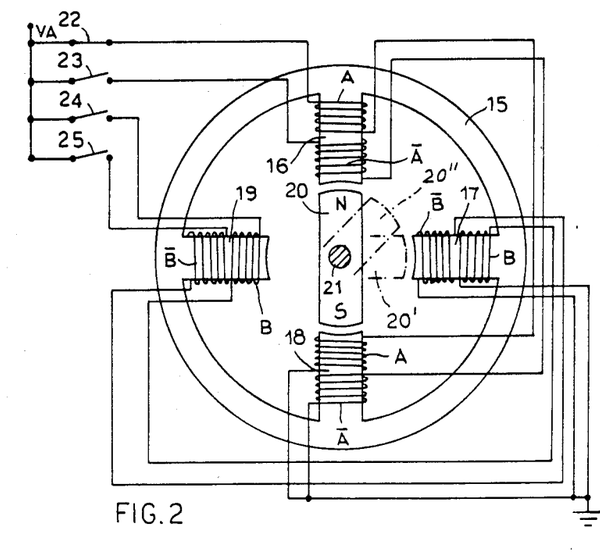
FIG. 2 is a diagrammatic view of a stepping motor of single-pole type.

FIG. 2 shows the equivalent diagram of a stepping motor of single-pole, four-phase type, which comprises a stator 15 provided with pole pieces of shoes 16, 17, 18 and 19 on which are wound windings A, $\overline{A}$, B and $\overline{B}$. A rotor 20 formed by a permanent magnet is mounted on a shaft 21 which is coaxial with respect to the stator 15. The windings A, $\overline{A}$, B and $\overline{B}$ have one end connected to the power supply VA by way of on-off switches 22, 23, 24 and 25 respectively, with another end connected to earth. Normally, to hold the rotor 20 stationary, the switch corresponding to the winding associated with the position which the rotor 20 is desired to assume is closed. For example, to hold the rotor 20 between the pole pieces 16 and 18, the switch 22 is closed and the winding A is energised to make the pole pieces 16 and 18 S and N poles respectively.

In order to rotate the rotor 20 with respect to the stator 15, the other windings are progressively energised: by closing the switch 24 and opening the switch 22, only the winding B is energised and the rotor 20 rotates by one step in a clockwise direction, moving into the position shown at 20' in dash-dotted lines in FIG. 2. If however the windings A and B are energised simultaneously, the rotor 20 takes up a position 20'' which is intermediate between the pole pieces 16 and 17. In that intermediate step or mid-step position, the rotor 20 is held stationary by a force which is the resultant of the two forces generated by the magnetic fields in the pole pieces 16 and 17 and therefore that stop position is preferred to that in which the rotor 20 is disposed precisely opposite one of the pole pieces of the stator 15. As will be seen, in single-pole stepping motors, the current always flow in the same direction in the windings.

Figure 3:
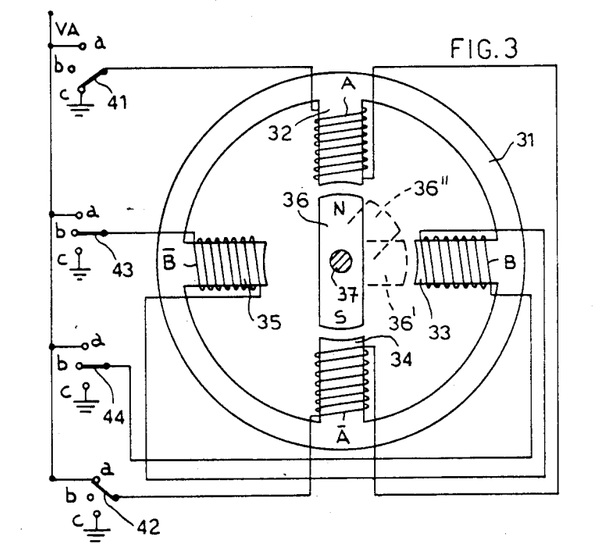
FIG. 3 is a diagrammatic view of a stepping motor of bipolar type.

FIG. 3, however, shows the equivalent diagram of a bipolar stepping motor comprising a stator 31 provided with radial pole pieces 32, 33, 34 and 35 on which windings A, B, $\overline{A}$ and $\overline{B}$ respectively are wound. A rotor 36 comprising a permanent magnet is mounted on a shaft 37.

The windings A and $\overline{A}$ are connected in series with each other and have one end connected to a switch 41 and the other end connected to a switch 42. The windings B and $\overline{B}$ are in turn connected in series and have one end connected to a switch 43 and another end connected to a switch 44. The switches 41, 42, 43 and 44 have three positions: a, b and c; the position a of each of the switches is connected to the power supply VA, the position b is open and the position c is connected to earth. In this type of motor, the current flows in both directions in the windings A, B, $\overline{A}$ and $\overline{B}$.

In the condition shown in FIG. 3, the switches 43 and 44 are open whereby current does not flow in the windings B and $\overline{B}$, the switch 41 is connected to earth and the switch 42 is connected to the power supply VA, whereby the current flows in the windings A and $\overline{A}$, holding the rotor 36 stationary with the pole N in front of the pole piece 32.

To rotate the rotor 36 in the clockwise direction by half a step (position 36″), the switch 43 is moved into position a and the switch 44 is moved into position c in such a way that current also flows in the windings B and $\overline{B}$.

Both types of motor, the single-pole and the bipolar type, may be controlled in such a way that the rotor performs half a stepping motion at a time, or a complete step at a time.

Figure 4:
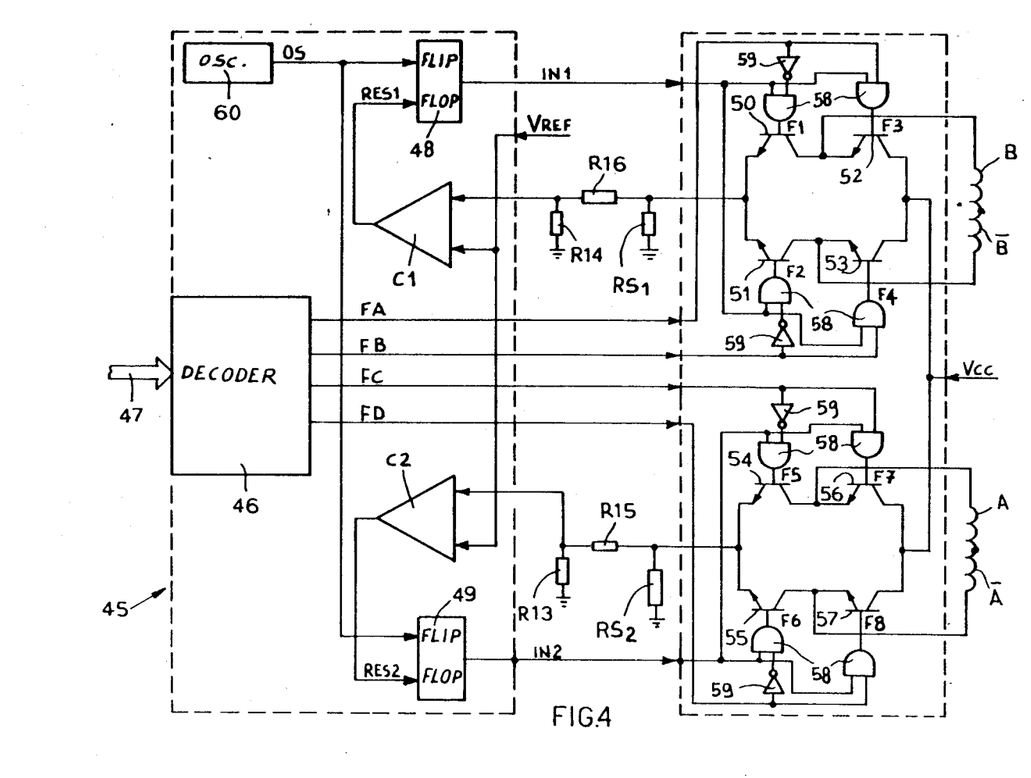
FIG. 4 is an electrical diagram of a control circuit of a stepping motor of bipolar type.

As regards controlling stepping motors, one of the most widely used modes of control is that which involves a constant current with intermittent function, or the "chopper" mode. The constant-current supply mode is used in order to be able to provide a torque which is virtually independent of speed, within a certain range of values, while the adoption of a chopper mode of operation, rather than a linear mode, makes it possible to provide a high ratio between useful output and power supplied. An example of a control circuit 45 is illustrated in FIG. 4 wherein four pairs of transistors 50, 51; 52, 53; 54, 55; and 56, 57 have their bases connected to logic signals F1, F2, F3, F4, F5, F6, F7 and F8, and acts as switches to cause the current to flow selectively in the windings A, $\overline{A}$, B and $\overline{B}$.

The signals F1 to F8 are the outputs of a series of AND-gates 58 and inverters 59 which have as their inputs signals FA, FB, FC and FD supplied by a decoder circuit 46 on the basis of the data that the latter receives from the controlling unit 13 on a channel 47 (see FIGS. 1 and 4) and signals IN1 and IN2 which are supplied by two flip-flops 48 and 49 respectively. The circuit 46 is of known type and is therefore not described in detail herein.

The circuit 45 further comprises an oscillator 60 which supplies timing pulses OS at a constant frequency, for example 22 kHz. The two flip-flops 48 and 49 are set by the signal OS and reset by signals RES1 and RES2 respectively which are outputted by two comparators C1 and C2. An input of each comparator C1 and C2 is connected to a reference signal $V_{REF}$ while applied to another input thereof is a signal which is taken off at one end of a sensing resistor $RS_1$ and $RS_2$ respectively.

Disposed between the resistors $RS_1$ and the comparator C1 is a voltage divider comprising two resistors R14 and R16; similarly, disposed between the resistor $RS_2$ and the comparator C2 are two resistors R13 and R15.

Figure 8:
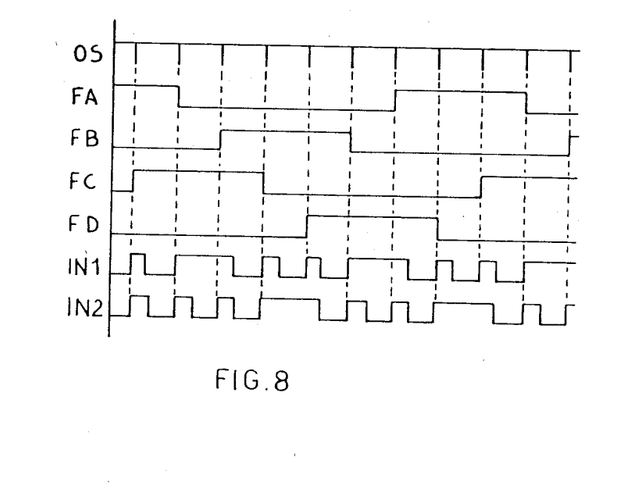
FIG. 8 is a diagram showing some signals in the circuits shown in FIG. 4 and FIG. 7.

The mode of operation to the circuit 45 is as follows:

It is assumed that the signal FA is at logic level 1 and that the signal FB is at logic level 0; that means that the transistors 51 and 52 are in the conducting condition and the transistors 50 and 53 are in the non-conducting condition; therefore, the current flows in the load formed by the windings B and $\overline{B}$ from the positive pole to earth by way of the transistors 51 and 52 and the sensing resistor $RS_1$. The current rises in value, thus causing an increase in the voltage at $RS_1$ until that voltage causes the comparator C1 which compares it continuously to the reference voltage $V_{REF}$ to operate. The comparator C1 switches the flip-flop 48 and sets to level 0 the inhibition signal IN1 which disconnects the power supply from the windings B and $\overline{B}$. The signal IN1 remains at level 0 until a fresh pulse OS (see FIG. 8) is generated by the oscillator 60 (see FIG. 4). When the signal IN1 goes to level 1, the initial power supply conditions are re-established; that being until the signal FA remains at level 1. A similar mode of operation is found in the circuit portion which controls the windings A and $\overline{A}$ by means of the signals FC and FD.

It is clear that the frequency at which the circuit 46 generates the signals FA, FB, FC and FD may vary in dependence on the angular distance that the rotor is to cover in order to reach the desired position. That is well known in the art and can be achieved by means of programs which are recorded in a memory of the unit 13. The time for covering that distance is minimised but the rotor does not stop at around the desired position but will tend to oscillate, thus delaying the moment at which the element controlled thereby may be used.

After those general considerations, the control circuit 10 (see FIG. 1) according to the invention will now be described in detail, which circuit makes it possible to damp the oscillations of the rotor after the rotor has been moved into the desired angular position.

In accordance with the invention, the damping circuit 14 is connected to one of the windings of the stepping motor 11 in such a way as to pick off an electrical signal which is representative of the speed of the rotor. That information is processed and used to affect the power supply to the other windings, as will be described in greater detail hereinafter.

Figure 5:
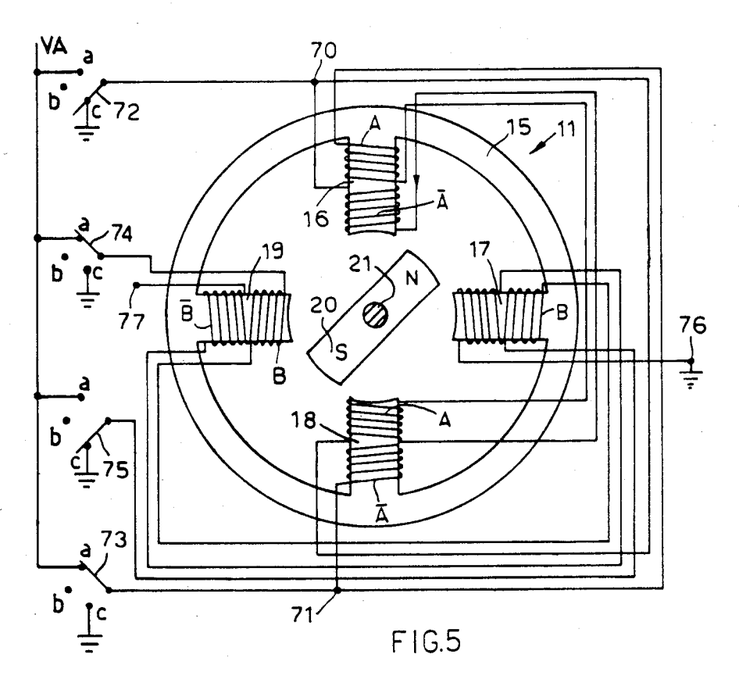
FIG. 5 is a diagrammatic view of a stepping motor which can be controlled by a circuit according to the invention.

As an example and in order to arrive at a better understanding of this feature of the invention, FIG. 5 illustrates a stepping motor of single-pole type, similar to that shown in FIG. 2, in which however the windings A and $\overline{A}$ are connected together in anti-parallel and the ends 70 and 71 thereof are connected to two three-way switches 72 and 73 and the winding B has the ends thereof connected to two switches 74 and 75. The winding $\overline{B}$ is not connected to the power supply VA but has one end 76 connected to earth and one end 77 connected to the damping circuit 14.

In that way, the motor 11, while being of single-pole type, has the windings thereof connected in such a way as accordingly to constitute in fact a bipolar type of motor.

The damping circuit 14 (see FIG. 6) comprises four blocks 80, 81, 82 and 83: the blocks 80 and 83 are filter and gain regulator means, the block 81 is merely an inverting block and the block 82 is a logic block for dealing with a signal ATT from the unit 13 and a signal POS from the circuit 46. In particular, the block 80 comprises an amplifier 85 having a first input to which the voltage signal that is proportional to the back EMF (electromotive force) taken off the winding $\overline{B}$ is applied by way of two resistors R2 and R3 and a capacitor C11. The other input of the amplifier 85 is connected to earth by way of a resistor R4. Disposed between the output of the amplifier 85 and its first input are a capacitor C12 and a resistor R1. The block 80 further comprises a resistor R12 and a capacitor C13.

Figure 6:
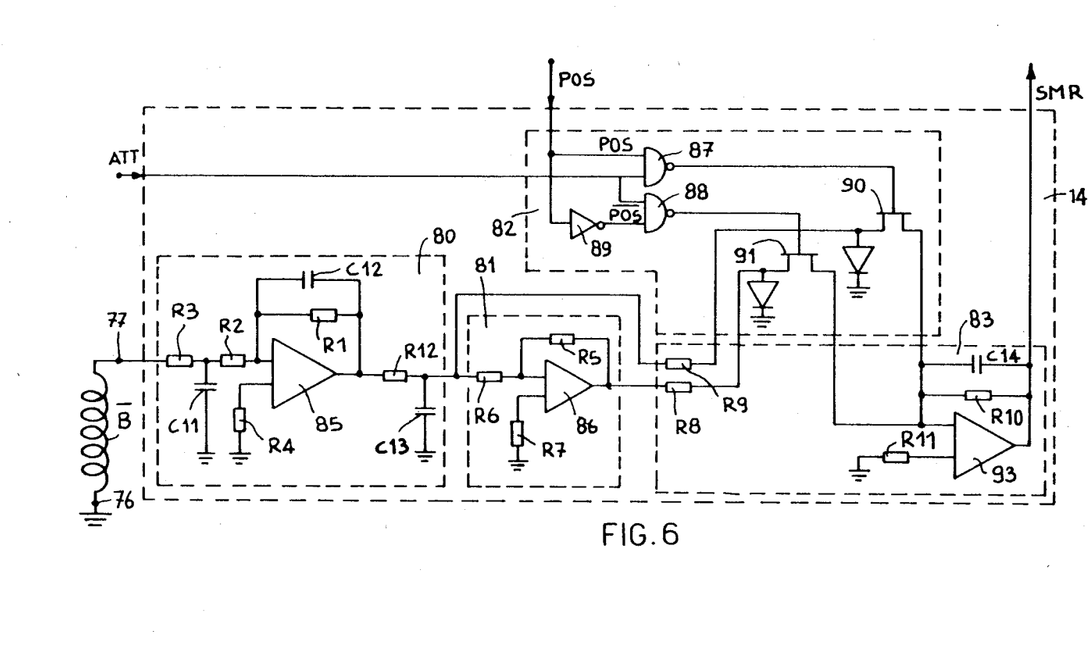
FIG. 6 is a detail view of a first part of a circuit embodying the invention.

The block 81 comprises an amplifier 86 which has a first input connected to the output of the block 80 by way of a resistor R6 and a second input connected to earth by means of a resistor R7. A resistor R5 is disposed between the output of the axplifier 86 and its first input.

The logic circuit 82 comprises two NAND gates 87 and 88 each having an input connected to the signal ATT from the unit 13 (see FIG. 1). The gate 87 (see FIG. 6) has its other input connected to the signal POS from the circuit 46 while the gate 88 has its other input connected to the output of an inverter 89, to the input of which is applied the signal POS. The block 82 further comprises two field effect transistors (FET) 90 and 91 having their control electrodes connected to the outputs of the gates 87 and 88 respectively. The input of the FET 90 is connected to the output of the block 80 by means of a resistor R9 while the input of the FET 91 is connected to the output of the block 81 by means of a resistor R8.

Figure 7:
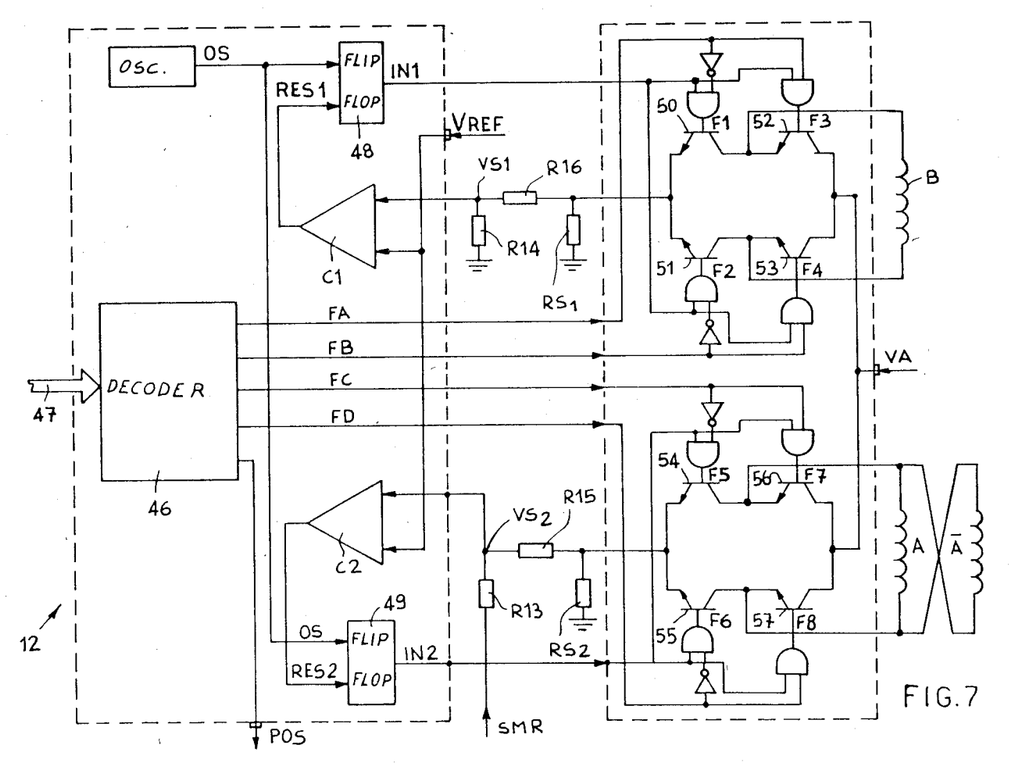
FIG. 7 is a detail view of a second part of the circuit.

The block 83 comprises the two resistors R8 and R9 and an amplifier 93 which has a first input connected to the outputs of the FETs 90 and 91 and another input connected to earth by means of a resistor R11. A capacitor C14 and a resistor R10 are disposed between the output of the amplifier 93 and its first input. The output SMR of the damping circuit 14 is applied to the control circuit 12 (see FIGS. 1 and 7).

The control circuit 12 is similar to the above-described circuit 45 (FIG. 4) in that the latter, as has been seen, is capable of controlling a bipolar stepping motor. The difference between the circuit 45 and the circuit 12 is that one end of the resistor R13, which is associated with the sensing resistor $RS_2$, is connected to the output SMR of the circuit 14. Accordingly the circuit 14 which reconstitutes the back EMF present in the winding $\overline{B}$ of the motor 11 and obtains therefrom speed information then modulates the current of the windings A and $\overline{A}$ to achieve the desired damping effect.

Figure 9:
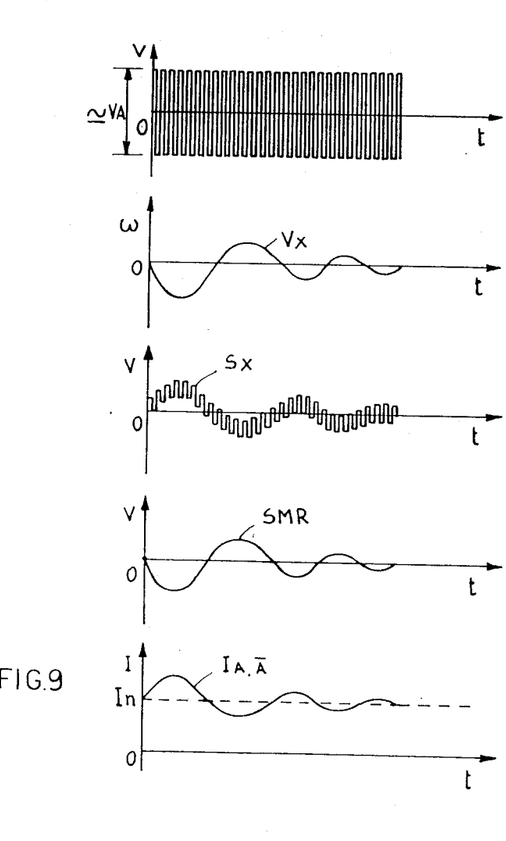
FIG. 9 is a group of diagrams showing some signals in the circuit of FIG. 6.

Other components, in addition to the back EMF signal, which is that which is to be isolated, are therefore present in the winding $\overline{B}$ which in this embodiment is not used for directly causing the rotary movement of the rotor. It should be considered therefore that, after having given the last advance movement order to the motor, the current is no longer varied in the winding B and that terms deriving from the possible variation in that current are consequently not present at the ends of the winding $\overline{B}$. Therefore, during the damping phase, the signal which is taken from the winding $\overline{B}$ contains only two terms: the square wave component at the frequency of the pulses OS and the back EMF. The square wave component is present because, as described above, the current in the windings A-$\overline{A}$ and B are regulated in a switching mode, that is to say, by closing and opening the power supply means at the frequency of the pulses OS. The component at a frequency of 22 kHz at the ends of the winding $\overline{B}$ is of a value between peaks which is approximately equal to the value of the power supply voltage VA (FIG. 9).

The block 80 of the circuit 14, by means of the three filters formed by the components R2, R3 and C11; R1 and C12; R12 and C13, filters the 22 kHz component of the signal of the winding B and, by means of the amplifier 85, amplifies the back EMF component. The output signal Sx of the block 80 is of the form shown in FIG. 9 and, although inverted, it will be seen that it is proportional to the signal Vx of effective angular speed of the motor shaft with respect to the nominal stopped speed, while also having a small residual 22 kHz component. Each filter attenuates the 22 kHz component by a factor of about 10 and thus, at the output of the block 80, the value of that component is equal to a thousandth of the product of the power supply voltage VA by the gain coefficient of the amplifier 85.

The way in which the signal representative of the angular speed of the rotor 20 is used to damp the oscillations of the rotor 20 with respect to the nominal stopped position thereof will now be described.

It is assumed that the rotor 20 is to be stopped in the position shown in FIG. 5 with the pole N in an intermediate position between the pole pieces 16 and 17, with the windings A, $\overline{A}$ and B energised simultaneously.

Observing the signal Vx (see FIG. 9), the speed of the rotor 20 is considered to be positive when it is moving towards the pole piece 16 and negative when it is moving towards the pole piece 17.

The winding $\overline{B}$ is wound on the pole pieces 17 and 19 in such a way as to generate by induction a voltage which is positive when the rotor is moving with its pole N towards the pole piece 16 and conversely negative when the rotor 20 is moving towards the pole piece 17. That induced signal is applied, being filtered and amplified by the circuit 14, to the circuit 12 in such a way that it modulates the current $I_{A,\overline{A}}$ in the windings A and $\overline{A}$. In particular, the current $I_{A,\overline{A}}$ will be of the form shown in FIG. 9: it will be higher than the nominal current $I_n$ when the rotor 20 is moving towards the pole piece 17 and lower than the nominal current $I_n$ when the rotor 20 is moving towards the pole piece 16.

When however the rotor 20 is stationary with its pole N disposed between the pole pieces 18 and 19, the currents in the windings A, $\overline{A}$ and B are inverted. In order to damp the oscillations of the rotor 20 with respect to its nominal position, it is necessary in this new condition also to invert the modulation of the current $I_{A,\overline{A}}$ in the windings A, $\overline{A}$. In order to achieve that result, use is made of the signal POS in respect of position of the rotor 20, which is generated by the decoder circuit 46. The signal POS is at logic level 1 when the rotor 20 has its pole N between the pole pieces 16 and 17 and at level 0 in the other cases.

When the unit 13 applies to the circuit 12 the last step command to be performed, it also sets at logic level 1 the signal ATT for activation of the circuit 14, which is normally deactivated, the signal ATT being at logic level 0.

With the signal ATT at logic level 1 (see FIG. 6), if the signal POS is also at logic level 1, the FET 90 is closed and the FET 91 is opened, while if the signal POS is at logic level 0, the FET 90 is opened and the FET 91 is closed.

Therefore, when the rotor 20 is stationary in the position shown in FIG. 5, the signal Sx which is outputted by the block 80 (see FIG. 6) is applied by way of the resistor R9 to the amplifier 93 of the block 83. The output signal SMR of the circuit 14 is inverted and amplified with respect to the signal Sx (see FIG. 9).

When however the rotor 20 (see FIG. 5) is stopped with its pole N between the pole pieces 18 and 19, the output signal Sx of the block 80 (see FIG. 6) is applied by way of the block 81 and the resistor R8 to the amplifier 93 of the block 83. With the block 81 being a simple inverting amplifier with unit gain, the signal Sx is inverted once by the block 81 and then again by the block 83 whereby the signal SMR (not shown in the drawing) which comes out of the circuit 14 is amplified but in phase with the signal Sx.

In both cases, the capacitor C14 performs the function of a further rejection filter for the 22 kHz component. As already noted above, the signal SMR is applied to the control circuit 12 (see FIG. 7).

The peak of the current $I_{A,\overline{A}}$ which flows in the windings A and $\overline{A}$ is equal to the ratio between $VS_2$ and $RS_2$, by virtue of the ratio between the sum of R13 and R15, and R13. Since the voltage VS$_2$ tends continuously to go to the value V$_{REF}$, the peak of the current I$_{A,\overline{A}}$ may be considered as equal to the ratio between V$_{REF}$ and RS$_2$, by virtue of the ratio between the sum of R13 and R15, and R13.

When the signal SMR is at zero, the current flowing in the windings A, $\overline{A}$ is the nominal current I$_n$; when however the signal SMR assumes positive or negative values, that causes a reduction or an increase respectively in the current I$_{A,\overline{A}}$ which flows in the windings, modulating same with respect to its nominal value I$_n$. That is because the voltage at RS$_2$, added to that of the signal SMR, must be maintained equal to VS$_2$ and thus to V$_{REF}$.

That gives rapid damping of the rotor 20.

It will be clear from the description herein that a damping circuit is connected to one of the windings of the motor to take off an electrical signal which is representative of the angular speed of the rotor and is capable of consequentially influencing the power supply of the other windings to damp the oscillations of the rotor during the stopping thereof in a given angular position. Other embodiments are also possible.

A circuit according to the invention has been used for controlling a stepping motor used for angular positioning of a character carrying disc (daisy wheel) of an office printer and has given surprising results. By eliminating the oscillations of the rotor the circuit has reduced by almost half the total time of each selection cycle, making the printer much faster.

What we claim is:

1. An electronic circuit for the control of a stepping motor having a rotor and a plurality of selectively energizable windings divided into four phases, said circuit comprising power supply means connected to three of said four phases for selectively energizing said three phases and causing rotary movement of said rotor towards a desired angular position, and a damping circuit connected to the fourth of said four phases to pick off an electrical signal representative of the angular speed of said rotor, wherein said damping circuit is connected to said power supply means to modify the power supply to said three phases of said windings in such a way as to damp the oscillations of said rotor during stopping thereof in said desired angular position, and wherein two of the three phases of said motor which are connected to said power supply means are connected together in anti-parallel mode so that said motor becomes a bipolar type.

2. An electronic circuit according to claim 1, wherein said rotor after reaching said desired angular position oscillates about said position, wherein said damping circuit is able to generate a control signal which is substantially proportional to the speed at which said rotor oscillates about said desired angular position, and wherein said control signal is connected to a sensing resistor associated with the windings of said two phases connected together in anti-parallel mode.

3. An electronic circuit for the control of a stepping motor having a plurality of fixed pole pieces, a rotor and a plurality of selectively energizable windings, said circuit comprising power supply means connected to said windings for causing rotary movement of said rotor towards a desired angular position, and a damping circuit connected to one of said windings to pick off an electrical signal representative of the angular speed of said rotor, wherein said damping circuit is connected to said power supply means to modify the power supply to the others of said windings in such a way as to damp the oscillations of said rotor during stopping thereof in said desired angular position wherein said desired angular position of said rotor is intermediate between two of said fixed pole pieces, on which windings of all the four phases are wound, and wherein, in order to stop the rotor in said desired position, said three phases connected to the power supply means are supplied with a current having a nominal value.

4. An electronic circuit according to claim 3, wherein said damping circuit comprises means for varying the current in the windings of the two phases which are connected in anti-parallel proportionally to the speed at which said rotor oscillates with respect to said desired angular position.

5. An electronic circuit for the control of a stepping motor having a rotor and a plurality of selectively energizable windings, said circuit comprising power supply means connected to said windings for causing rotary movement of said rotor towards a desired angular position, and a damping circuit connected to one of said windings to pick off an electrical signal representative of the angular speed of said rotor, wherein said damping circuit is connected to said power supply means to modify the power supply to the others of said windings in such a way as to damp the oscillations of said rotor during stopping thereof in said desired angular position, wherein said power supply means supplies the windings of said motor in a modulated mode at a predetermined frequency, and wherein said damping circuit comprises at least one demodulator for said electrical signal representative of the angular speed of said rotor.

6. For use in a rotary wheel printing system having a rotary wheel with a plurality of individual print characters, a stepping motor with a rotor and a plurality of windings selectively energizable for rotating said wheel and selecting the character to be printed, and an electronic circuit for controlling said stepping motor, the improvement wherein said electronic circuit comprises power supply means connected to said windings for supplying said windings in a modulated mode at a predetermined frequency for causing rotary movement of said rotor towards a desired angular position wherein a damping circuit is connected to one of said windings to pick off an electrical signal representative of the angular speed of said rotor, and wherein said damping circuit comprises at least one demodulator for said electrical signal representative of the angular speed of said rotor, and is connected to said power supply means to modify the power supply to the other of said windings in such a way as to damp the oscillations of said rotor during stopping thereof in said desired angular position.

* * * * *